(12) United States Patent
Stratford et al.

(10) Patent No.: US 11,941,130 B2
(45) Date of Patent: Mar. 26, 2024

(54) SECURE DATA STORAGE

(71) Applicants: Ken Stratford, Worcester (GB); Ivan Knezovich, Far Forest (GB)

(72) Inventors: Ken Stratford, Worcester (GB); Ivan Knezovich, Far Forest (GB)

( * ) Notice: Subject to any disclaimer, the term of this patent is extended or adjusted under 35 U.S.C. 154(b) by 206 days.

(21) Appl. No.: 16/993,716

(22) Filed: Aug. 14, 2020

(65) Prior Publication Data

US 2022/0050903 A1    Feb. 17, 2022

(51) Int. Cl.
| | |
|---|---|
| *G06F 21/00* | (2013.01) |
| *G06F 16/172* | (2019.01) |
| *G06F 21/60* | (2013.01) |
| *G06F 21/64* | (2013.01) |
| *H04L 9/06* | (2006.01) |
| *H04L 9/30* | (2006.01) |
| *H04L 9/00* | (2022.01) |

(52) U.S. Cl.
CPC .......... *G06F 21/602* (2013.01); *G06F 16/172* (2019.01); *G06F 21/64* (2013.01); *H04L 9/0637* (2013.01); *H04L 9/30* (2013.01); *H04L 9/50* (2022.05)

(58) Field of Classification Search
None
See application file for complete search history.

(56) References Cited

U.S. PATENT DOCUMENTS

| | | |
|---|---|---|
| 5,859,968 A | 1/1999 | Brown |
| 6,026,502 A | 2/2000 | Wakayama |
| 9,811,686 B1 | 11/2017 | Marquardt et al. |
| 2008/0168247 A1 | 7/2008 | Goodwill et al. |
| 2009/0292889 A1 | 11/2009 | Durfee |

(Continued)

FOREIGN PATENT DOCUMENTS

| | | | |
|---|---|---|---|
| CN | 102752286 | 10/2012 | |
| CN | 111295649 A | * 6/2020 | ......... G06F 12/0868 |

(Continued)

OTHER PUBLICATIONS

International Search Report from related PCT Application No. PCT/GB2016/052651, dated Oct. 28, 2016.

(Continued)

*Primary Examiner* — Andrew J Steinle
(74) *Attorney, Agent, or Firm* — Grossman, Tucker, Perreault & Pfleger, PLLC; Donald J. Perreault

(57) ABSTRACT

Methods of securely storing and providing data in a data storage system, and a corresponding system are described. A method comprises the steps of: connecting the security module to a remote host only within a predetermined remote access time window, wherein said remote access time window is stored on the security module; receiving a file transfer request from the remote host to the security module; authenticating the file transfer request; receiving the file and caching the file within the security module; isolating the remote host from the security module; connecting the security module and the data storage device; transferring the cached file from the security module to be stored in the data storage device; and isolating the security module and the data storage device once file transfer is complete. This provides a secure system where a data storage device is controllably connected to a remote host.

10 Claims, 1 Drawing Sheet

(56) References Cited

U.S. PATENT DOCUMENTS

| | | | | | |
|---|---|---|---|---|---|
| 2009/0328183 | A1* | 12/2009 | Frenkel | ............... | G06F 21/30 726/11 |
| 2013/0185229 | A1 | 7/2013 | Naga et al. | | |
| 2013/0311737 | A1 | 11/2013 | Shaw et al. | | |
| 2015/0150082 | A1 | 5/2015 | Grube et al. | | |
| 2016/0330203 | A1 | 11/2016 | Frenkel | | |

FOREIGN PATENT DOCUMENTS

| | | | | |
|---|---|---|---|---|
| GB | 2543394 | A | 4/2017 | |
| GB | 2570914 | | 8/2019 | |
| WO | 2017/033023 | | 3/2017 | |
| WO | WO-2017033023 | A1 * | 3/2017 | ............. G06F 21/78 |
| WO | 2018144585 | A1 | 8/2018 | |
| WO | 2019126305 | A1 | 6/2019 | |

OTHER PUBLICATIONS

Written Opinion of the International Searching Authority from related PCT Application No. PCT/GB2016/052651, dated Oct. 28, 2016.

International Preliminary Report on Patentability, dated Feb. 27, 2018, in related International Application No. PCT/GB2016/052651.

Anonymous: Tech Stuff: Buffalo NAS 'auto' power mode, Jan. 13, 2013, XP055312101, retrieved from the Internet: URL:http/chris-hill-tech.blogspot.de/2013/01/buffalo-nas-auto-power-mode.html, 2 pages.

"A smart vault for your online files", https://web.archive.org|webfl01905260945411https://www.b4e.com/, Great Britain, Aug. 14, 2020.

Office Action from related U.S. Appl. No. 15/754,819, dated Nov. 1, 2019.

Notice of Allowance from related U.S. Appl. No. 15/754,819, dated Jun. 2, 2020.

Search Report from related British Appln. No. GB1802177.4m dated Aug. 8, 2018.

Examination Report under Section 18(3) of United Kingdom Application No. GB1802177.4, dated Mar. 15, 2023, 3 pages total.

Search and Examination Report under Section 17 and 18(3) of United Kingdom Application No. GB1802177.4, dated Nov. 10, 2022, 9 pages total.

* cited by examiner

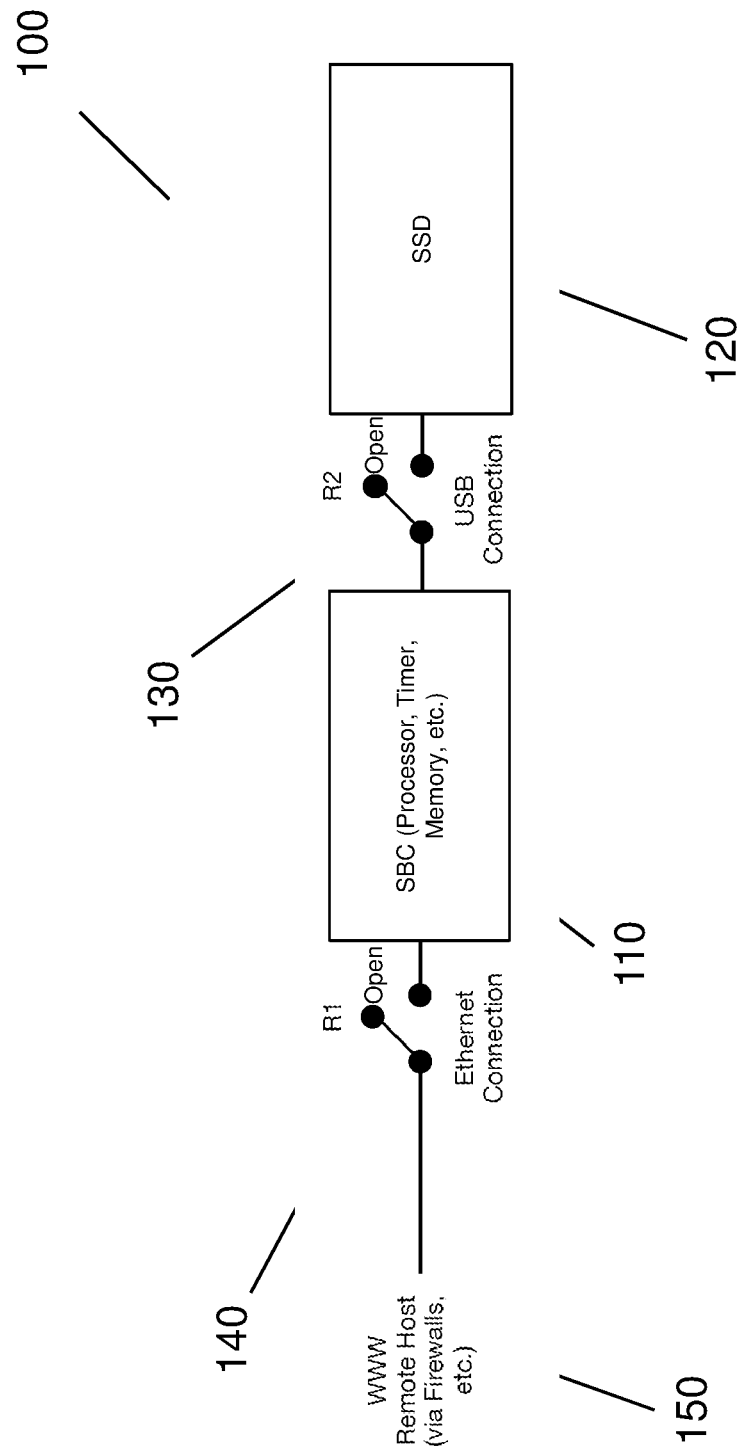

SECURE DATA STORAGE

FIELD

The present disclosure describes methods and a system for secure data storage. In particular a method of securely storing data, a method of providing data securely stored and a data storage system are disclosed.

BACKGROUND

In an increasingly digital world, the ability to securely store digital data, either as a digital record of a document, or as an original digital entity in its own right, is becoming an important consideration. As the amount of electronic data produced requiring storage continues to increase, this need becomes more pressing. Secure storage of physical hard copies of files and data is no longer practical or possible due to the volume and type of sensitive data being generated, and some data is not practical to store in this manner—for example transactional materials such as cryptocurrencies exist solely in digital form.

The requirement for secure data storage is paramount in a number of industries. Such data storage has long moved beyond storage of physical copies of files and digital copies are now used to secure personal data and other secure data. As an example, cryptocurrencies 'owned' by a user are currently (typically) secured in a cryptocurrency wallet, which acts a digital store of the relevant private keys for each cryptocurrency unit. This storage of digital entities may only exist in digital form.

However, whilst encryption is an essential part of securing this digital data, a key vulnerability remains due to the systems used to store the data being connected to the World Wide Web. Such systems are sometimes (in cryptocurrency terminology) referred to as 'hot wallets'. Hot wallets and other internet connected storage devices have vulnerabilities due to their internet connection. Furthermore, software based internet connected storage solutions rely on the integrity of the software and/or storage server. If the software or server is hacked, the information is vulnerable.

The information contained in many of the documents intended for storage is often important confidential information, as it may contain sensitive financial and legal information (for example contracts and wills), confidential personal details (such as medical records) or even data that may be relevant to security (e.g. password lists, safety records, etc.). However, users of such existing solutions, particularly cloud-based solutions, are often naively lax in ensuring that the documents are securely archived and their access highly restricted.

One solution is to only store secure data on isolated systems that are never physically connected to the internet, but this removes the practicalities or firstly storing the data and secondly retrieving the data because the user must be physically present at a terminal of the isolated system in order to retrieve the information. Nevertheless, such solutions exist, with one example being a cryptocurrency 'cold wallet'. A cold wallet is typically a piece of hardware that stores digital data on a hardware device that is only connected to the internet manually by the user when the digital data is required. The user must have physical control of the hardware device or cold wallet in order to access the digital data.

At the opposite end of the spectrum, cloud storage solutions exist which allow a user to access their secure files from any location via the internet. Secure files can also be added as needed. However, with this ease of access again comes the risk of secure files being compromised if the cloud server is hacked.

The above scenarios all have deficiencies, requiring either physical hardware that is tied to the user, software solutions to modify and protect the contents of the secure files and data, or a reliance on third parties to secure a user's data. All are undesirable. Encryption methods are inevitably vulnerable to concerted efforts to decrypt. Furthermore, cloud-based systems are also potentially vulnerable to access by experts in computer networking and architectures. Furthermore, for such cloud systems, data files are accessible at all times, even when encrypted. This can allow duplication of the encrypted data and/or the use of decryption techniques that analyze the structure of the data, manipulate the storage system, or that use brute-force methods to decrypt the encrypted data.

A related application by the present inventors, WO2017033023, provides a system and method for secure data storage and operates by providing an independent digital storage device, each digital storage device comprising a data storage device configured to store user data; a switch for regulating a supply of electrical power to the or each data storage device; and a security module for activating the switch and for storing timing restrictions that define a time window. The switch may only be activated to power the data storage device during the time window, improving the security of the user data. Whilst this solution ameliorates many of the issues with other known solutions, a live internet connection or data connection is still required between either the security module itself, or for a server controlling the one or more security modules.

The present disclosure aims to at least ameliorate problems inherent with existing secure data storage systems.

SUMMARY

According to a first aspect of the present invention there is provided a method of securely storing data in a data storage system comprising a data storage device and a security module, said security module isolated from the data storage device, said method comprising the steps of: receiving a file transfer request from a remote host to the security module; authenticating the file transfer request; receiving the file and caching the file within the security module; isolating the remote host from the security module; connecting the security module and the data storage device; transferring the cached file from the security module to be stored in the data storage device; and isolating the security module and the data storage device once file transfer is complete.

This aspect provides a secure digital storage system whereby a data storage device is controllably connected to a remote host, such as the internet. The security module acts as a gatekeeper or sanitizer, screening data/file transfer requests. Additionally, the method ensures that the data storage device is isolated from the remote host, minimizing risk of compromise of data stored on the data storage device.

In embodiments, the security module may be initially isolated from the remote host, whereby the method further comprises the step of: connecting the security module to the remote host only within a predetermined remote access time window, wherein said remote access time window may be stored on the security module.

These steps provide further security for the system. By also isolating the security module from the remote host, outside of a predetermined remote access time window, the duration which the security module is exposed to the remote host (i.e. the internet) is minimized, which further reduces the risk of the security module being compromised. By storing the timing restrictions (i.e. the remote data access window) only on the security module, it is not possible for the remote host to know when the security module is able to accept file transfer requests. In the case of a malicious remote host, which does not know the valid remote data access window, the malicious remote host would need to continually attempt to access the security module.

The security module may be automatically connected to the remote host at the start of the predetermined remote access time window. The security module may be automatically disconnected from the remote host at the end of the predetermined remote access time window. This automatic connection and/or disconnection of the security module and the remote host minimizes the inconvenience to the user (who would otherwise have to manually instruct the security module), and also removes the need for any alternative or additional mechanism for opening and closing the connection to and from the remote host.

Typically, the security module may be isolated from the remote host by a remote data relay. Similarly, the security module may be isolated from the local host by a local data relay. The data relay may be a switch or may be a bus controller, such as a Universal Serial Bus (USB®) or the like.

In example, the step of connecting the security module and data storage device may require that the security module is isolated from the remote host. This step ensures that the data storage device is not exposed to the remote host (via the security module).

It can be appreciated that the step of connecting the security module and the data storage device may occur only within a predetermined local access time window, wherein said local access time window is typically stored on the security module. This can provide a quarantine or isolation time window whereby file transfer requests are cached on the security module, allowing the user to change their mind about storing the file on the data storage device. It may also be appreciated that this time delay may allow for additional authentication, for example to allow for a two-factor authentication process to be undertaken.

The security module and/or the data storage device may encrypt the cached file using public key cryptography. Similarly, the security module and/or the data storage device may maintain an integrity of the cached file using a blockchain encryption protocol. Data transfer between the security module and the remote host may also additionally or alternatively be encrypted, for example using SFTP (secure file transfer protocol) or the like.

In embodiments comprising a remote access time window, the method may further comprise the step of queueing file transfer requests from the remote host received outside of the remote access time window in a network based host for later authentication by the security module during the remote access time window. The network based host may comprise a network security module for receiving the file transfer requests, and wherein the network security module may then authenticate a file transfer request prior to caching the file within the network based host. The network security module may be configured to only receive file transfer requests during a network access time window. Accordingly, the step of authenticating the file transfer request may comprise the step of the security module authenticating the identity of the network based host. Access to any cached files residing on the network based host may also be stored behind a network data relay. It can be appreciated the network data relay may be configured to operate in a similar manner to the remote access data relay described above.

The method may also comprise the step of permanently opening the remote data relay if a security incident is detected by the security module. Permanently opening the remote data relay isolates the security module from the remote host. The security module may also permanently open the local data relay, permanently isolating the data storage from the security module (and therefore from the remote host). A security incident may include one or more of malicious files, failed authentication, or malicious attempts to circumvent the restrictions placed by the remote access time window. The security module may permanently open the data relays by overwriting any stored time window with no timings such that the security module never opens the remote data relay. Alternatively or additionally the security module may have a dedicated software flag that is triggered in the event of a malicious event that acts as an alarm and prevents the security module from closing any of the relays.

According to a second aspect of the present invention, there is provided a method of providing data securely stored in a data storage system comprising a data storage device and a security module, said security module, said security module isolated from the data storage device, said method comprising the steps of: receiving a file transfer request from a remote host to the security module for a file stored in the data storage device; authenticating the file transfer request; isolating the remote host from the security module; connecting the security module and the data storage device; transferring the file and caching the file within the security module; isolating the security module and the data storage device; connecting the security module and the remote host; and transferring the file from the security module to the remote host.

In embodiments, the step of authenticating the file transfer request may comprise the step of comparing credentials of the remote host with credentials stored in security module.

It can be appreciated that embodiments and features described above with respect to the first aspect may also be applicable to the second aspect.

According to a third aspect of the present disclosure, there is provided a data storage system for securely storing and retrieving user data, said system comprising: a data storage device configured to store user data; a local data relay for controlling local data access to the data storage device, whereby data access is allowed in a closed position and the data storage device is isolated in an open position; a remote data relay for controlling remote data access to a remote host whereby remote data access is allowed in a closed position and the remote host is disconnected in an open position; and a security module configured to activate the local data and remote data relays, and for storing timing restrictions that define a remote access time window, wherein at least the remote data relay may only be closed to access the user data during the remote access time window; and wherein only the security module can open and close the data relays, and only one data relay can be closed at once.

This aspect provides a system for securely storing and retrieving data to and from data storage device that is completely isolated from the remote host. The remote host is typically the internet (World Wide Web). The security module acts as a gateway, or gatekeeper. The described system, in particular the timing of the opening and closing of the relays, may ensure that the data storage system is never exposed to a live remote host. This greatly reduces the risk of compromise of the data storage system.

Provision of a remote access time window adds a further layer of security. The remote access time window is typically user defined and is used to ensure that the security module can only communicate with the remote host during a (user) defined limited timeframe. Attempts to access the security module outside of the remote access time window are unsuccessful.

In an embodiment, the data relays may only be opened or closed by the security module. This provides further isolation and prevents outside interference of another server that could potentially close the data relays and expose the data storage device to the remote host.

The security module may automatically close the remote data relay at the start of the remote access time window to allow remote data access to the security module. It may be appreciated that the security module may automatically open the remote data relay at the end of the remote access time window to disconnect the remote host from the security module.

The security module may authenticate file transfer requests from the remote host. In this way, only authenticated file transfer requests made within the designated remote access time window are permitted. Authentication provides additional security. Authentication methods may utilize ciphertext based methods, symmetric key methods including block ciphers etc. Blockchain may be utilized to verify successful file transfer at each stage of the file storage and retrieval process. The encryption protocols may be ciphertexts associated with each security module. 256 bit encryption techniques such as AES or an alternative symmetric or asymmetric encryption protocol may be used. The encryption protocols may additionally or alternatively be biometric based encryption methods. Example biometrics may include fingerprint scanning, retinal scanning or other biometric data. Two-stage authentication may also be used, such as sending an electronic message to a mobile phone via a messaging service, or using an app.

In embodiments, the credentials to authenticate the file transfer request are only stored on the security module. This prevents malicious requests being sent if the data storage device is compromised. This also simplifies operation of the data storage device.

The security module typically receives accredited files from the remote host once the credentials of the remote host have been verified as trustworthy. Once received, the security module transfers the accredited files to the data storage device. The security module may also retrieve accredited files from the data storage device. The security module may also transfer accredited files to the remote host. Typically, the security module, after receiving a file, may close the remote relay, isolating the data storage system from the remote host. Typically, the security module comprises a processor for controlling the data storage device. The security module may also comprise RAM, or other local data storage for storing cached versions of the files prior to storage on the data storage device. A file size limit may be implemented depending on the size of the available cache. The processor may be used to control the data relays.

In examples, the data relays may be physical relays or electronic relays. In further or related examples, in their open position the first and/or remote data relay may physically isolate the security module.

The security module may be configured to permanently open the local data relay after a security incident isolating the data storage from the security module (and therefore from the remote host). Alternatively or additionally, the security module may permanently open the remote data relay after a security incident isolating the security module from the remote host. A security incident may include one or more of malicious files, failed authentication, or repeated attempts to query the security module (or if present, the network host) outside of the remote access time window, akin to a brute force attempt to overcome the remote access time window request (i.e. by continually attempting to contact the security module, the malicious remote host may not need to know the remote access time window). It may be appreciated that IP blocking may be used to restrict access to or prevent access from whitelisted or blacklisted IP addresses.

In an embodiment, the security module may queue authentic data requests received outside the remote access time window.

In a related but alternative embodiment, a network based cache may instead queue requests received outside of the remote access time window for later authentication by the security module during the remote access time window. The network based cache may then transfer the queued request to the security module during the remote access time window. The security module may then transfer the file to the data storage device (in the manner described above), after opening the data relay between the remote host and the security module to isolate the data storage system from the remote host. This reduces the time that the security module is awake and exposed to the remote host.

It may also be appreciated that the use of a network based cache may add a further layer to the data storage system. A network security module may sit between the remote host and the network based host. In such an embodiment, the security module of the data storage system described above is connected to the network based host. The network security module may operate in a similar manner to the security module, and may or may not feature a second time window, referred to as a network access time window. A network data relay may also be used to connect and isolate the network security module to the remote host (with the remote access data relay of the security module providing connections to the network security module). As an example, a remote host may send a request to transfer files to data storage device. The network security module receives the request (optionally only within a secondary network access time window stored on the network (for example in the network security module), and further optionally using a network data relay configured in the manner described above) and authenticates the identity of the remote host. If authorized, the network security module allows the file transfer request to be cached in the network based host. This request is then queued for transmission to the security module when the remote access time window of the data storage device is active (as determined by the security module).

This provides a two-step process. Firstly, authentication of the remote host is undertaken by the network security module before a file transfer is cached in the network based host. Secondly, the security module authenticates either one or both of the initial request and the network host before allowing file transfer (in the manner described above).

Data access outside of the remote access time window may be prevented by electrically disconnecting the data storage device from the data storage system. The data storage device is then powered off outside of the remote access time window. It can be appreciated, that individual components relating to the data access may be powered off, rather than the entire data storage device. For example, a data connection between the data storage device and the security module may be electrically disconnected outside of the remote access timing window. In any case, the local data relay may act to regulate the supply of electrical power to each data storage device in this manner The relay may only be activated to power the data storage device during the remote access time window, or may have an alternative time window, referred to as the local access time window which is the only time when the relay allows data and optionally also power connections to the data storage device. It can be appreciated that the use of a local access time window minimizes the risk of any malicious attempt to access data stored on the data storage device during the remote access time window.

The present invention provides a greatly reduced risk of compromise of data stored in a data storage device by unauthenticated attackers obtaining access to part of the data storage system.

As noted above, the data storage system has a security module that defines access to the data (via the data relays) only during a time window. The time window may be a repeating time period of a certain number of minutes, hours or seconds per day, or it may be only for certain days of the year or it may be a non-repeating time period. The time windows are typically electrical access control times, allowing or restricting electrical access to the data storage system during the specified times. The time windows may further define data modification control times, whereby data modification (i.e. data writes and deletions) may only be performed during the specified times. The key aspect is that the time window is controlled by a user and set, typically, during initial configuration of the security module.

In embodiments, the security module is configured to receive and validate an access request from a remote host requesting data access to or from a data storage device. Additionally, the access request may be provided by a technology platform of the user. Additionally or alternatively, the security module may require the access request to be made using a virtual private network to be a valid access request.

The security module may further comprise a clock for providing an access request time of an access request—a comparison allows for validation. The clock is typically a real-time clock. In particular, the security module is configured to compare the access request time to the stored timing restrictions (remote access time window and, where present, local access time window) such that the security module only allows activation of the relays in response to the access request if the access request time lies within the requested time window.

As noted above, in one example, the data storage system may be a redundant array of data storage systems. Each independent data storage system may operate as an independent unit, and may be located within a remote secure server environment.

The remote data relay may allow data access from a user's security module to a user's private network in the manner described above. An authenticated connection is generally used to ensure authenticity and integrity between the system and the individual user. Examples of such authenticated connections include virtual private networks and Secure File Transfer Protocol (SFTP) connections.

In embodiments where a network based host is provided, the user may instead securely connect to the network based host and transfer files securely in the manner described above. Connections may be reliant on access being safeguarded using a network security module as described above. Once authenticated and received on the network, the network transfers the file to the data storage device via the security module as described above. An advantage of this additional step (namely using the network server host, network based cache and network security module) is that the IP address of the user sending the file is masked to the security module and the data storage device. Accordingly, even if the data storage device or security module is compromised, the identity of the user is not able to be determined through an IP analysis of the files stored or transferred. Any stored IP address present in the file will be the IP address of the network based host.

In further embodiments, electrical power is supplied only to the data storage device during a data read and/or write access request. This further limits the time during which the data storage devices are vulnerable to unauthorized data access attempts. The electrical power may be provided by the local data relay (such as power over Ethernet, USB or the like) or, preferably, it may be separate.

For all aspects, it may be appreciated that the data storage systems may be single board computers such as a Raspberry Pi™ connected to hard drives or solid state memory, or may be single board computers comprising the security module and data storage on a single board or chip. The security module and/or the single board may comprise a computer or computer components, as described below.

There may be provided a computer program, which when run on the computer, causes the computer to configure any system or apparatus, including a circuit, controller, sensor, filter, or device disclosed herein or perform any method disclosed herein. The computer program may be a software implementation.

The computer may be considered as any appropriate hardware, including a digital signal processor, a microcontroller, and an implementation in read only memory (ROM), erasable programmable read only memory (EPROM) or electronically erasable programmable read only memory (EEPROM), or a chip as non-limiting examples. The software implementation may be an assembly program.

The security module may comprise a processor and ROM and optionally RAM. It can be appreciated that time windows and authentication keys may be stored on ROM, whilst the RAM typically stores cached versions of the file for transfer (although a hard drive or flash based memory may be used for the cache). Accordingly, where a time window is used, the security module may be automatically powered off outside of the time window to erase data stored in the RAM. Similarly, a timer may be used on the security module and/or the single board computer to provide timing information to the security module and the single board computer generally as required.

The computer program may be provided on a computer readable medium, which may be a physical computer readable medium, such as a disc or a memory device, or may be embodied as a transient signal. Such a transient signal may be a network download, including an internet download.

These and other aspects of the disclosure will be apparent from, and elucidated with reference to, the embodiments described hereinafter.

BRIEF DESCRIPTION OF DRAWINGS

Embodiments will be described, by way of example only, with reference to the drawings, in which:

FIG. 1 shows an embodiment of a data storage system according to the present disclosure.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF THE DRAWINGS

FIG. 1 shows a schematic outline of a data storage system 100 according to the present disclosure. The storage system 100 is for securely storing and retrieving user data, typically from a single user. The system 100, comprises a single board computer 110 (SBC), such as a Raspberry Pi® or a custom SoC. The SBC 110 comprises a processor, timer, memory and the like. The SBC as a whole may be considered to be a security module, although the security module may be a separate component of the SBC itself, such as a dedicated hardware component on the SoC of the SBC.

Additionally, the system 100 comprises a data storage device 120 configured to store user data. The storage device is typically a solid state drive (SSD), although other storage mediums (such as RAID systems for data security and/or data integrity) may be used. The data storage device 120 is connected to the SBC 110 via a local data relay 130. The local data relay 130 is a USB connection, although it can be appreciated that any suitable protocol (SATA, M.2) may be used. The local data relay 130 is solely controlled by the SBC 110. In an open position, the data storage device 120 is isolated from the SBC 110, whilst data access is allowed in a closed position. The SBC 110 may encrypt/decrypt data passing between the data storage device and the data storage device 120. Data transferred between the data storage device 120 and the security module/SBC 110 is encrypted and sent using SFTP or the like.

Also connected to the security module 110 is a remote data relay 140 for controlling remote data access to a remote host 150, such as an internet based host or local server. Firewalls may be used to screen incoming data connection requests and restrict port access. The remote data access relay 140 is typically an Ethernet connection, although wireless access protocols (or any wired data access protocol) may be used. Remote data access between the remote host 150 and the security module 110 is allowed in a closed position of the remote data relay 140, whilst remote host 150 is disconnected or isolated in an open position of the remote data relay 140.

The SBC, in particular the security module 110, is configured to activate the local and remote data relays 130, 140, and for storing timing restrictions that define a remote access time window. The security module also stores authentication data. The remote access time window provides timing restrictions when the security module 110, either automatically or in response to a user command, is able to open the remote data access relay 140. For example, if Ethernet is used as the remote data relay, the relay may rely on Power over Ethernet protocol. By removing electrical power from the relay the Ethernet connection no longer accepts incoming connections from remote hosts and can be considered to be an open connection.

The remote access time window is stored within the security module only and is configured by the user (typically of the data storage device) during configuration of the system. Accordingly, the remote data relay 140 may only be closed to access or provide the user data during the remote access time window. This provides a cold storage system, which is isolated from the internet except for during predicted (only if the time window is known) timings. The timings may repeat at a regular interval or may be user determined according to an alternative pattern or even at random.

The security module 110 provides an additional security feature by controlling the opening and closing of the local data relay 130. In the embodiment described the security module 110 can open and close the data relays 130, 140, however only one data relay can be closed at once. This ensures that the data storage device 120 is never directly exposed to the remote host 150.

Whilst only one data relay can be closed at once, both data relays may be opened at once. Indeed, both relays may be open by default, with the remote data relay 140 only closing at predetermined times. The security module 110 is also configured to permanently open the relays 130, 140 if a malicious attempt to access the data storage device 120 is detected. This may be achieved by overwriting the stored time window with no timing information. In such case the data storage device 120 is completely isolated from the remote host 150 and the security module 110 and the security module 110 is also completely isolated from the remote host 150.

In use, a user such as a remote host 150 who wishes to store data, such as a file, within their data storage device 120 first provides a file transfer request to the security module 110. The security module, by default, is isolated from the data storage device 120 (i.e. the local data relay 130 is open).

If a remote access timing window is provided, then the security module is only configured to receive file transfer requests during this window (i.e. the remote data relay 140 is only closed during this time window).

The security module then authenticates the file transfer request, which may involve cryptographic checks, before the user is able to transfer the file into a cache within the security module 110 (or SBC). Once safely received, the security module opens the remote data relay 140, isolating the remote user from the security module 110. Further authentication checks may then be made to the file as necessary, and/or authentication provided by the security module 110 (such as a blockchain encryption).

With the file authenticated and the remote host isolated, the security module then connects to the data storage device 120 by closing the local data relay 130. The cached, authenticated, file is then securely transferred to the data storage device 120 using a secure file transfer protocol (such as SFTP). Once file transfer is complete, the security module 110 and the data storage device 120 are isolated by opening the local data relay 130.

File retrieval works in a similar manner—a user or remote host 150, optionally only within a time window stored on the security module 110, supplies a file transfer request and authentication credentials to the security module. Provided the request is authentic, the security module isolates the remote host and connects to the data storage device 120 to retrieve the requested file. The data storage device 120 is then isolated from the security module 110 and a connection with the remote host 150 re-established.

In a related alternative embodiment, file transfer requests provided outside of the remote data access time window may be queued and handled by a network based host, with the request and if present file for transfer, being secured in a network based cache. When the remote access time window is open, the network based host transfers the file to the security module as described above. The network based host may also instruct the security module to open the remote data relay as soon as the file transfer is complete. This reduces the time that the security module is active. A network data access time window may be stored on the security module in such instances such that that network connection between the security module and the network based host is only open at predefined times.

In further alternative embodiments, the security module may utilize a local data access time window to only transfer data cached within the security module to the data storage device 120 at specific times. This allows the security module to act as a temporary cache or storage for files before they are securely transferred to the data storage device. This may have uses for cryptographic wallets.

From reading the present disclosure, other variations and modifications will be apparent to the skilled person. Such variations and modifications may involve equivalent and other features which are already known in the art of design realization and extrusion and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness, it is also stated that the term "comprising" does not exclude other elements or steps, the term "a" or "an" does not exclude a plurality, and reference signs in the claims shall not be construed as limiting the scope of the claims.

What is claimed is:

1. A method of securely storing data in a data storage system comprising a data storage device and a security module, said security module initially isolated from the data storage device, and further comprising a remote host, said remote host initially isolated from the security module, said method comprising the steps of:
receiving a data access request to or from the data storage device from the remote host to the security module wherein the security module is connected to the remote host only within a predetermined remote access time window, wherein said remote access time window is stored on the security module, and wherein data access requests from the remote host received outside of the remote access time window in a network based host are queued for later authentication by the security module during the remote access time window;
authenticating the data access request by the security module authenticating the identity of the network based host;
determining whether the data access request is a request to send a file from the remote host to the data storage device or is a request to retrieve a file from the data storage device for sending to the remote host;
where the data access request is a request to send a file from the remote host to the data storage device, receiving the file and caching the file within the security module;
isolating the remote host from the security module;
connecting the security module and the data storage device;
transferring the cached file from the security module to be stored in the data storage device; and
isolating the security module and the data storage device once file transfer is complete.

2. The method according to claim 1, wherein the security module is automatically connected to the remote host at the start of the predetermined remote access time window.

3. The method according to claim 1, wherein the security module is automatically disconnected from the remote host at the end of the predetermined remote access time window.

4. The method according to claim 1, wherein the security module is isolated from the remote host by a remote data relay or by a local data relay.

5. The method according to claim 1, wherein the step of connecting the security module and data storage device requires that the security module is isolated from the remote host.

6. The method according to claim 1, wherein the step of connecting the security module and the data storage device occurs only within a predetermined local access time window, wherein said local access time window is stored on the security module.

7. The method according to claim 1, wherein the security module and/or the data storage device encrypt the cached file using public key cryptography.

8. The method according to claim 1, wherein the security module and/or the data storage device maintains an integrity of the cached file using a blockchain encryption protocol.

9. The method according to claim 1, wherein the network based host comprises a network security module for receiving the file transfer requests, and wherein the network security module authenticates a file transfer request prior to caching the file within the network based host.

10. A method of providing data securely stored in a data storage system comprising a data storage device and a security module, said security module initially isolated from the data storage device, said method comprising the steps of:
connecting the security module to the remote host only within a predetermined remote access time window, wherein said remote access time window is stored on the security module;
receiving a data access request from a remote host to the security module for sending a file to, or retrieving a file from the data storage device;
queuing data access requests from the remote host received outside of the remote access time window in a network based host for later authentication by the security module during the remote access time window;
authenticating the data access request by comparing credentials supplied by the remote host with credentials of the remote host stored in the security module;
isolating the remote host from the security module;
determining whether the data access request is a request to send a file from the remote host to the data storage device or is a request to retrieve a file from the data storage device for sending to the remote host;
where the data access request is a request to retrieve a file from the data storage device host to the remote host, connecting the security module and the data storage device;

transferring the file from the data storage device and caching the file within the security module;
isolating the security module and the data storage device;
connecting the security module and the remote host; and
transferring the file from the security module to the remote host.

\* \* \* \* \*